Figures 1, 2:
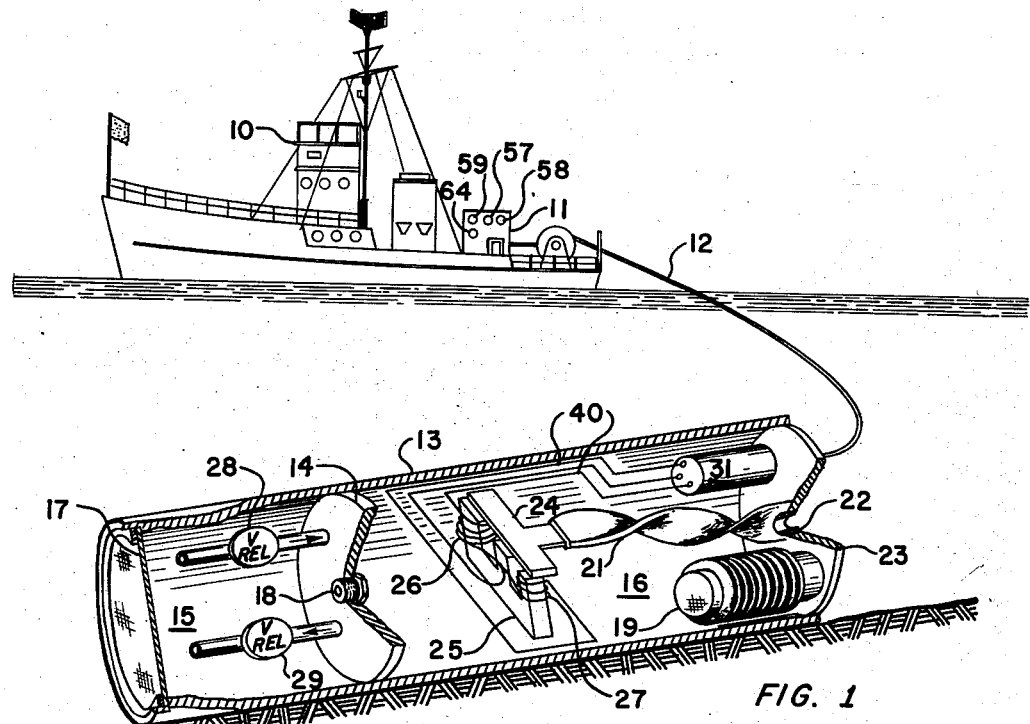

June 9, 1959 C. A. WHITTAKER ET AL 2,890,411
MEASUREMENT OF UNDERWATER PRESSURE VARIATIONS
Filed July 7, 1955

INVENTORS
Clyde A. Whittaker
Roy E. Donegon
BY
ATTORNEYS

United States Patent Office 2,890,411
Patented June 9, 1959

2,890,411

MEASUREMENT OF UNDERWATER PRESSURE VARIATIONS

Clyde A. Whittaker, Panama City, Fla., and Roy E. Donegon, Colorado Springs, Colo., assignors to the United States of America as represented by the Secretary of the Navy Application July 7, 1955, Serial No. 520,638

5 Claims. (Cl. 324—59)

(Granted under Title 35, U.S. Code (1952), sec. 266)

The invention described herein may be manufactured and used by or for the Government of the United States of American for governmental purposes without the payment of any royalties thereon or therefor.

The present invention relates to the measurement of pressure variations such as are produced by swells, the passage of ships, or devices for sweeping pressure responsive mines.

An object of the invention is to make possible the detection of small variations in underwater pressure more accurately than heretofore.

Another object of the invention is to provide a pressure measuring system which can readily be calibrated during use and in a simple manner.

A further object of the invention is to provide a sensitive bridge circuit without employing distortion-critical circuits.

Other objects of the invention, as well as the invention itself, will become apparent from the following description when read in connection with the accompanying drawing in which Fig. 1 is a conventionalized perspective view of the pressure measuring system in use; and Fig. 2 is a diagrammatic showing of the electrical circuits employed in the system.

The preferred embodiment of the invention to be described in detail is adapted to measure pressure variations in water depths as great as one hundred and fifty feet and comprises an underwater unit containing a hydraulic filter for static pressure compensation and a differential pressure gauge which functions to change the ratio of two electrical inductances, and a shipboard unit containing two electrical resistances which are coupled through a connecting cable to the inductances in the underwater unit to form a bridge circuit, an oscillator for driving the bridge circuit, and an indicating and recording device actuated in accordance with the bridge signal.

In accordance with the invention the two resistive arms of the bridge are made unequal to unbalance the bridge by an amount sufficient to insure that it will not go through balance for the largest pressure change to be measured. Also in accordance with the invention an impedance is arranged to be connected across one of the inductance arms of the bridge to change its balance by an amount equal to a certain known pressure signal thereby providing a simple calibrating signal, the arrangement preferably being such that the calibrating change in bridge balance is introduced at the same point in the bridge circuit as is a pressure change whereby the calibration impedance for any particular pickup remains valid even though used with different shipboard units and with different cable lengths.

Referring now to Fig. 1 of the drawing, a surface vessel 10 is shown equipped with a shipboard unit 11 of a variable pressure measuring system connected through a cable 12 to an underwater pressure pickup unit 13. The pickup unit 13 is divided by a partition 14 into two compartments 15 and 16 which are completely filled with a liquid such as castor oil. The oil in the compartment 15 is subjected to the total pressure in the water outside the unit 13 through a flexible diaphragm 17, such as sheet rubber, and this total pressure is transmitted to the oil in the compartment 16 through a small orifice 18. To prevent the transmission to the compartment 16 of rapid variations in pressure, a spring-loaded gas-filled bellows 19 is mounted in the compartment 16 to comprise in conjunction with the orifice 18 a low-pass hydraulic filter, the orifice 18 functioning as a hydraulic resistance while the bellows 19 acts as a hydraulic compliance. The time-constant of this filter should be less than seven minutes and a value of about five minutes has been found to be quite satisfactory. The static or average value of the total pressure present in the compartment 16 is utilized as the reference pressure for one side of a differential pressure sensing element 21 here shown as a twisted closed end tube the inside of which is exposed directly to the outside water through an opening 22 in the outside end wall 23 of the compartment 16. The tube 21 twists or untwists in accordance with the pressure difference from inside to outside and these torsional deflections are employed to vary the air gaps in an electromagnetic pickup unit as follows: The free closed end of the tube 21 has mounted thereon a flat permeable armature 24 which is supported with its ends spaced above the outer legs of an E-shaped core 25 which are wound with coils 26 and 27, the arrangement being such that as the armature 24 is rotated by the tube 21 the air gaps are oppositely varied with corresponding variations appearing in the inductances of the coils 26 and 27.

The bulkhead 14 separating the two compartments 15 and 16 is also provided with pressure relief valves 28 and 29 for limiting the pressure difference on opposite sides of the bulkhead 14 to any desired low value such as five p.s.i. in either direction, thereby preventing any overloading of the pressure difference sensing tube 21 when the underwater unit 13 is rapidly submerged or recovered. Also, as will be described in connection with Fig. 2, a calibration resistance and relay 31 is suitably mounted in any convenient location in the underwater unit 13 such as on the end wall 23.

As shown in Fig. 2 the two coils 26 and 27, whose inductances are varied in accordance with variations in pressure, with cable leads 40 and resistances 41 and 42 form a bridge circuit. As indicated in Fig. 2 the two resistive arms 41 and 42 are made unequal by an amount sufficient to keep the bridge from going through balance for the largest pressure changes to be measured. In an application where the maximum pressure variation to be measured was forty inches of water and the bridge signal for this amplitude was about 0.14 volt, the bridge was deliberately unbalanced to deliver a signal of about 0.20 volt.

Bridge excitation voltage is supplied by an oscillator 43, carefully chosen for amplitude stability, through an amplifier 44 and leads 45. The alternating current signal from the bridge is coupled through a line-to-grid transformer 46 to a signal amplifier 47 the output of which is rectified by a rectifier 48 and compared with the rectified output of a rectifier 49. The output of the bridge drive amplifier 44 is employed as a reference signal by coupling it through a plate-to-line transformer 51 to a reference amplifier 52 the output of which drives the rectifier 49. The amplifying and rectifying circuits for the bridge and reference signals are preferably identical.

The direct current outputs of the rectifiers 48 and 49 are connected in series with a voltage divider 53 so that they subtract from each other and inasmuch as the level of the bridge signal changes with pressure while the level of the reference signal does not, the direct current voltage delivered to the voltage divider 53 by the opposed rectifiers 48 and 49 will be proportional to pressure changes. The voltage divider 53, which may be shunted by a capacitor 54, constitutes a range-switch attenuator which is coupled to a measuring instrument 55, preferably of the indicating and recording type, through a direct current amplifier 56 and a switch arm 57 movable to contact selectively any one of take-off terminals of the divider 53. These take-off terminals, here shown as four in number, are labeled 2, 5, 20, and 40 which terms may denote in inches of water the peak-to-peak pressures required to produce side-to-side deflections on the recording meter 55.

A potentiometer 58 for adjusting the input to the signal amplifier 47 provides a sensitivity control for the system. Similarly, a potentiometer 59 for the input to the reference amplifier 52 provides a balance control. By adjusting the potentiometer 59 to bring the level of the reference signal to the level of the bridge signal, the system is balanced so that the output voltage to the recorder 55 is zero for zero pressure difference at the differential pressure sensing element 21.

As was mentioned above, an impedance such as a resistor 61 mounted in the underwater unit 13 is adapted to be connected across the variable inductance 26 by the polarized relay 31 which can be energized from a suitable supply voltage on leads 62 through a cable lead 63 by means of a normally open double throw switch 64 provided on the shipboard unit 11. The resistance value of the resistor 61 is so chosen that when it is shunted across the inductance 26 it produces a change in bridge balance equal to the change caused by a known pressure difference. Thus, calibration becomes the simple matter of completing the circuit through the resistor 61 and adjusting the sensitivity control potentiometer 58 until the meter element of the recorder 55 indicates the known pressure difference represented by the resistor 61.

In use, the pickup unit 13 is submerged to its intended operating position and given time for hydraulic compensation to occur, i.e., the pressure in the compartments 15 and 16 approach equality. The balance control 59 is adjusted to bring the recorder to approximately its mechanical zero position which generally is selected as being the center line of the record receiving chart. The range switch 57 is set for the deflection sensitivity desired and the balance control 59 adjusted to bring the recorder 55 to its mechanical zero position. The zero of the system ordinarily changes somewhat whenever the range switch 57 is changed and therefore the balance control should be accurately adjusted after each change in the setting of the range switch 57.

To check the sensitivity of the system the switch 64 is closed momentarily in the direction (here assumed to the right) to move the armature of the relay 31 to the right where it connects the resistor 61 in parallel with the inductance 26. This produces a bridge signal equivalent to a known pressure change, such as thirty-two inches of water, and if a corresponding deflection is obtained in the recorder 55 the sensitivity is known to be correct. If the proper deflection is not obtained for the calibration signal the sensitivity control 58 is adjusted as required after which the balance control 59 is adjusted to zero the system. These successive adjustments should be repeated until the proper deflection for the calibration signal is obtained and this can be done quite rapidly after a small amount of practice.

One of the advantages incidental to incorporating the calibration resistor in the pickup unit is that once its proper value has been established it holds good for that particular pickup unit and is indifferent to what shipboard unit is employed.

While for the purpose of disclosing the invention a specific embodiment thereof has been described in detail, it is to be understood that other embodiments are contemplated and that other means for sensing pressure variations may be employed for varying the bridge inductances. Many variations will be obvious to those skilled in the art and such variations are intended to be included within the scope of the appended claims.

What is claimed is:

1. Apparatus for indicating at a surface station pressure variations sensed by a pickup unit positioned at a remote point under water, including in combination, an unbalanced bridge circuit comprising two inductive adjacent arms positioned at the pickup unit and whose inductance ratio varies in response to pressure variations at the pickup unit, and two unequal resistive adjacent arms positioned at the surface station, a source of electrical oscillations connected in parallel with the two sets of adjacent arms for driving the bridge whereby an output signal appears across the juncture points of the inductive arms and the resistive arms, means for amplifying and rectifying the output signal, means for amplifying and rectifying a portion of the electrical oscillations to provide a reference signal equal to the portion of the output signal produced by the built-in unbalance of the bridge circuit, and meter means responsive to the algebraic difference between the reference signal and the output signal.

2. The apparatus claimed in claim 1 in which a calibrating impedance at the pickup unit is connectable in parallel with one of said inductive arms by means controlled from the surface station to introduce a change in the ratio between the inductances of said two inductive arms corresponding to a pressure change of known magnitude whereby the accuracy of the apparatus may be checked by noting any discrepancy between the pressure as measured and the pressure change known to have been introduced.

3. Apparatus for measuring short term pressure variations sensed by a pickup unit having two electric inductances differentially variable in response to pressure variations sensed by said unit, comprising a bridge circuit having bridge branches including said inductances and two unequal resistances and having an energizing diagonal and a measuring diagonal, a direct current measuring instrument, two separate amplifying and rectifying channels having individual inputs and having their rectified outputs connected in opposed relation to said instrument, a source of alternating current connected across said energizing diagonal and across the input to one of the amplifying and rectifying channels, and means connecting the input to the other of the amplifying and rectifying channels across said measuring diagonal.

4. Apparatus in accordance with claim 3 wherein the inequality of the two bridge resistances is of a magnitude sufficient to produce across the measuring diagonal a signal at least equal in strength to the strongest signal to be produced across said diagonal by pressure-variation induced changes in said inductances.

5. Apparatus in accordance with claim 3 and wherein a resistance element is connectable at will in shunt relation with at least a portion of one of said inductances to vary the ratio between said inductances by an amount known to correspond to a certain amplitude of pressure variation, whereby the calibration of the apparatus may be checked by connecting said resistance element in said shunt relation and noting the correspondence between the response of said measuring instrument and the amplitude of the simulated pressure variation.

References Cited in the file of this patent

UNITED STATES PATENTS

| | | |
|---|---|---|
| 2,627,539 | Tompkins | Feb. 3, 1953 |
| 2,715,331 | Yates | Aug. 16, 1955 |
| 2,715,717 | Keithley | Aug. 16, 1955 |
| 2,771,583 | Bloch | Nov. 20, 1956 |

FOREIGN PATENTS

| | | |
|---|---|---|
| 880,507 | Germany | June 22, 1953 |